US008718641B2

(12) United States Patent
Baek et al.

(10) Patent No.: US 8,718,641 B2
(45) Date of Patent: May 6, 2014

(54) CELL SEARCH METHOD IN WIRELESS COMMUNICATION SYSTEM

(75) Inventors: Young Seok Baek, Daejeon (KR); Bon Tae Koo, Daejeon (KR); Jung Ho Myung, Daejeon (KR); Joon Hyuk Kang, Daejeon (KR)

(73) Assignees: Electronics and Telecommunications Research Institute, Daejeon (KR); Korea Advanced Institute of Science and Technology, Daejeon (KR)

( * ) Notice: Subject to any disclaimer, the term of this patent is extended or adjusted under 35 U.S.C. 154(b) by 373 days.

(21) Appl. No.: 13/273,780

(22) Filed: Oct. 14, 2011

(65) Prior Publication Data

US 2012/0100880 A1 Apr. 26, 2012

(30) Foreign Application Priority Data

Oct. 22, 2010 (KR) ........................ 10-2010-0103661

(51) Int. Cl.
*H04W 4/00* (2009.01)
*H04B 7/00* (2006.01)

(52) U.S. Cl.
USPC .................... 455/434; 455/435.2; 455/435.3; 455/525

(58) Field of Classification Search
USPC ........ 455/434–444, 525, 552.1, 553.1, 160.1; 370/331–334
See application file for complete search history.

(56) References Cited

U.S. PATENT DOCUMENTS 6,480,558 B1* 11/2002 Ottosson et al. ............. 375/350
7,613,104 B2* 11/2009 Bhatt et al. ................... 370/208
7,961,709 B2* 6/2011 Lindoff et al. ................ 370/350
8,437,308 B2* 5/2013 Lindoff ......................... 370/331
2006/0274843 A1* 12/2006 Koo et al. ..................... 375/260
2008/0233959 A1* 9/2008 Klatt ............................. 455/436
2008/0244364 A1* 10/2008 Shieh et al. ................... 714/784
2009/0080547 A1* 3/2009 Naka et al. ................... 375/260
2009/0232125 A1* 9/2009 Kim et al. ..................... 370/350
2009/0257409 A1* 10/2009 Chang et al. .................. 370/336
2010/0054184 A1* 3/2010 Kishiyama et al. ........... 370/328
2010/0220694 A1* 9/2010 Huang et al. .................. 370/336
2011/0013591 A1* 1/2011 Kakumaru .................... 370/331
2011/0103350 A1* 5/2011 Lindoff ......................... 370/332
2011/0171962 A1* 7/2011 Iwamura et al. .............. 455/437
2013/0045739 A1* 2/2013 Chiang ...................... 455/435.1

FOREIGN PATENT DOCUMENTS

KR 1020100076986 A 7/2010

OTHER PUBLICATIONS

Jung-In Kim et al., "A CP Detection Based SSS Detection Method for Initial Cell Search in 3 GPP LTEFDD/TDD Dual Mode Downlink Receiver", Journal of the Korea Information and Communications Society, 2010, pp. 113-122, vol. 35 No. 1, Korea Information and Communications Society, South Korea.

* cited by examiner

*Primary Examiner* — Dominic E Rego

(57) ABSTRACT

Provided is a cell search method in a wireless communication system. According to the cell search method, when detecting SSS in order to search a cell group ID in 3GPP LTE communication, it is possible to reduce the computational complexity for SSS detection by selecting the sequence group of which cross-correlation between initially grouped SSS sequences is a predetermined value or more, computing cross-correlation with the sequences in the selected sequence group, and extracting a cell group ID through detection of the SSS sequence having the highest cross-correlation.

5 Claims, 5 Drawing Sheets

Fig.3

| Group # | Sequence # | Group # | Sequence # | Group # | Sequence # |
|---|---|---|---|---|---|
| Group 1 | 0,30,59,87,114,140,165 | Group 2 | 1,31,60,88,115,141,166 | Group 3 | 2,32,61,89,116,142,167 |
| Group 4 | 3,33,62,90,117,143 | Group 5 | 4,34,63,91,118,144 | Group 6 | 5,35,64,92,119,145 |
| Group 7 | 6,36,65,93,120,146 | Group 8 | 7,37,66,94,121,147 | Group 9 | 8,38,67,95,122,148 |
| Group 10 | 9,39,68,96,123,149 | Group 11 | 10,40,69,97,124,150 | Group 12 | 11,41,70,98,125,151 |
| Group 13 | 12,42,71,99,126,152 | Group 14 | 13,43,72,100,127,153 | Group 15 | 14,44,73,101,128,154 |
| Group 16 | 15,45,74,102,129,155 | Group 17 | 16,46,75,103,130,156 | Group 18 | 17,47,76,104,131,157 |
| Group 19 | 18,48,77,105,132,158 | Group 20 | 19,49,78,106,133,159 | Group 21 | 20,50,79,107,134,160 |
| Group 22 | 21,51,80,108,135,161 | Group 23 | 22,52,81,109,136,162 | Group 24 | 23,53,82,110,137,163 |
| Group 25 | 24,54,83,111,138,164 | Group 26 | 25,55,84,112,139 | Group 27 | 26,56,85,113 |
| Group 28 | 27,57,86 | Group 29 | 28,58 | Group 30 | 29 |

CELL SEARCH METHOD IN WIRELESS COMMUNICATION SYSTEM

CROSS-REFERENCE TO RELATED APPLICATIONS

The present application claims priority to Korean patent application number 10-2010-0103661, filed on Oct. 22, 2010, which is incorporated by reference in its entirety.

BACKGROUND OF THE INVENTION

The present invention relates to a cell search method in a wireless communication system, and more particularly, to a cell search method capable of reducing the computational complexity for Secondary Synchronization Signal (SSS) detection by selecting a sequence group of which a cross-correlation between SSS sequences is a predetermined value or more, and then performing cell search only within the sequence group during the SSS detection for searching a cell group ID in 3GPP LTE communication.

Recently, the $3^{rd}$ Generation Partnership Project (3GPP), which is a W-CDMA Organizational Partner, is conducting research on Long Term Evolution (LTE) as a relay technology of the $4^{th}$ Generation wireless communication which can be a successor of W-CDMA or HSPDA.

As wireless access technology of the LTE system, Orthogonal Frequency Division Multiple Access (OFDM) has been adopted for the downlink, and Single-Carrier Frequency Division Multiple Access (SC-FDMA) has been adopted for the uplink.

OFDM is a transmission technique for dividing frequency bands into plural subcarriers and transmitting data through each subcarrier. This technique assigns subcarriers closely so as to partially overlap with each other in the frequency domain without interfering with each other, thereby realizing high-speed transmission and improving the utilization efficiency of frequency.

SC-FDMA is a transmission technique for dividing a frequency band and transmitting data through different frequency bands between plural terminals, thus making it possible to reduce interference between the terminals. This technique can realize low power consumption and wide coverage of a terminal because this technique has the characteristic that the variation in transmission power is small.

Also, in order to reduce the effect of inter-symbol interference caused by a slow wave in OFDM, LTE has two types of Cyclic Prefixes (CPs) having different lengths, of which one is a normal CP and the other is an extended CP. For example, the extended CP is applied to large-radius cells and transmission of Multimedia Broadcast Multicast Service (MBMS) signals, but the normal CP is applied to small-radius cells.

Generally, in a wireless communication system using W-CDMA, LTE, or the like, a mobile station should perform cell search which is an operation of finding out a cell with good wireless quality and setting up wireless link in order to establish communication environment with a base station based on synchronization signals during power-on, standby, communication, or intermittent reception under communication.

The above-described technology means the background in the art to which the present invention pertains, but does not mean the prior art.

In a cell search method in an LTE communication, cell search is performed by using Primary Synchronization Signal (PSS) sequence and Secondary Synchronization Signal (SSS) sequence.

An LTE system identifies a total of 504 cells because there are 168 cell group IDs each of which includes three cell IDs, wherein the PSS sequence identifies three cell IDs and the SSS sequence identifies 168 cell group IDs. Therefore, the LTE system may perform synchronization and cell search using these two signals.

First, by using the cross-correlation between the PSS sequence transmitted through frames and a known PSS sequence, the LTE system estimates symbol timing and frequency synchronization, and then obtains cell IDs in a cell group ID.

Thereafter, the LTE system finds out the SSS sequence having the highest cross-correlation using cross-correlations between the SSS sequence transmitted through frames and all of 168 known SSS sequences, and then detects frame boundaries and cell group IDs.

However, the aforesaid method has a problem in that applying cross-correlations to all occasions leads to an increase in computational complexity at a receiver because there are 168 types of SSS sequences each of which is comprised of a sequence of length 62 symbols.

SUMMARY OF THE INVENTION

Embodiments of the present invention are directed to a cell search method in a wireless communication system, which is capable of reducing the computational complexity for Secondary Synchronization Signal (SSS) detection by selecting a sequence group of which a cross-correlation between SSS sequences is a predetermined value or more, and then performing cell search only within the sequence group during the SSS detection for searching a cell group ID in 3GPP LTE communication.

In one embodiment, a cell search method in a wireless communication system includes: extracting a cell ID by using a first synchronization signal, and selecting a sequence group by computing a primary cross-correlation between a received second synchronization signal and respective sequence groups; computing a secondary cross-correlation between all sequences of the selected sequence group and the received second synchronization signal; and extracting a cell group ID through a sequence with the highest cross-correlation resulting from the computation of the secondary cross-correlation.

The first synchronization signal used in the present invention may be a Primary Synchronization Signal (PSS) sequence.

The received second synchronization signal used in the present invention may be a Secondary Synchronization Signal (SSS) sequence.

The sequence group used in the present invention may be created by computing cross-correlations between all the sequences which identify cell group IDs and grouping sequences having the cross-correlation of a predetermined value or more.

In the present invention, the selecting of the sequence group may include computing a cross-correlation with any one of sequences belonging to the sequence group by sequence groups, and selecting a sequence group having the highest cross-correlation.

BRIEF DESCRIPTION OF THE DRAWINGS

FIG. 3 illustrates a table showing sequence groups grouped by a cell search method in a wireless communication system according to one embodiment of the present invention.

DESCRIPTION OF SPECIFIC EMBODIMENTS

Hereinafter, a cell search method in a wireless communication in accordance with the present invention will be described in detail with reference to the accompanying drawings. Herein, the drawings may be exaggerated in thicknesses of lines or sizes of components for the sake of convenience and clarity in description. Furthermore, terms used herein are defined in consideration of functions in the present invention and may be varied according to the custom or intention of users or operators. Thus, definition of such terms should be determined according to overall disclosures set forth herein.

Figure 1:
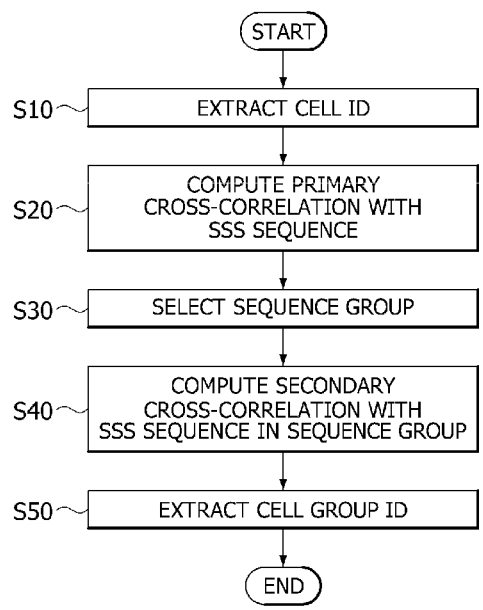
FIG. 1 illustrates a flowchart for explaining a cell search method in a wireless communication system according to one embodiment of the present invention.
Figure 2:
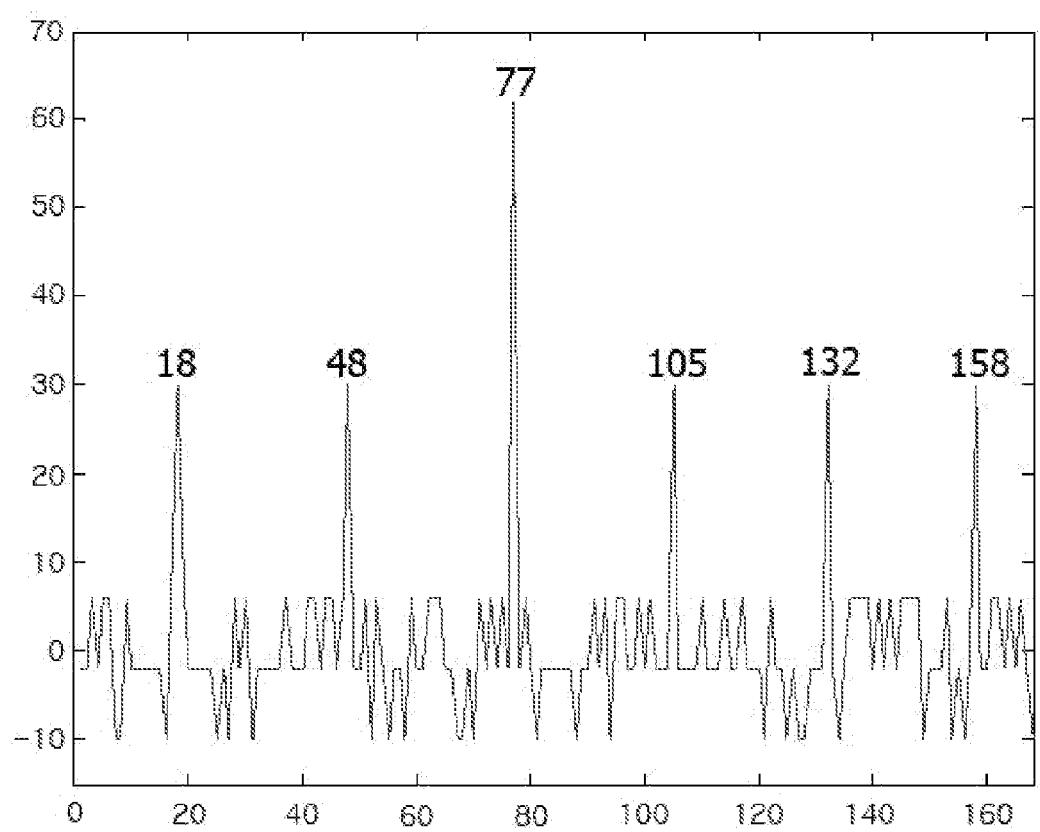
FIG. 2 illustrates a graph showing a cross-correlation of a sequence group for explaining a cell search method in a wireless communication system according to one embodiment of the present invention.

FIG. 1 illustrates a flowchart for explaining a cell search method in a wireless communication system according to one embodiment of the present invention, FIG. 2 illustrates a graph showing cross-correlation of a sequence group for explaining a cell search method in a wireless communication system according to one embodiment of the present invention, and FIG. 3 illustrates a table showing sequence groups grouped by a cell search method in a wireless communication system according to one embodiment of the present invention.

As illustrated in FIG. 1, in operation S10, a cell search method in a wireless communication system according to one embodiment of the present invention begins with computing a cross-correlation between a PSS sequence which is a first synchronization signal transmitted through a frame and a known PSS sequence to thereby estimate symbol timing and frequency synchronization and then extract cell IDs.

Thereafter, computes a primary cross-correlation between SSS sequence which is a second synchronization signal transmitted through a frame and each sequence group in operation S20, and then selects a sequence group in operation S30.

There are cross-correlations among 168 SSS sequences identifying 168 cell group IDs, and therefore, the sequence group is created by computing cross-correlations for the respective SSS sequences and grouping the sequences having the cross-correlation of 30 or more.

That is, as illustrated in FIG. 2, for example, $77^{th}$ sequence has the highest cross-correlation in relation to itself, but also has cross-correlations of 30 or more in relation to $18^{th}$, $48^{th}$, $105^{th}$, $132^{nd}$, and $158^{th}$ sequences. Thus, it is possible to increase SSS sequence detection probability even in the case of computing cross-correlations only with the sequences having the cross-correlations of a predetermined value or more without computing cross-correlations with all sequences during the SSS detection.

In the present embodiment, therefore, by computing cross-correlations for all of 168 sequences and grouping the sequences whose cross-correlation is 30 or higher, 30 sequence groups are created initially and then summarized in Table shown in FIG. 3.

A reference value of cross-correlation was set to 30 in the present embodiment, however, it may be set to a value greater or smaller than 30.

In addition, the primary cross-correlation with any one of sequences belonging to the sequence group is computed by sequence groups for the received SSS sequences, and the sequence group having the highest primary cross-correlation is then selected.

That is, the sequence group is selected using the sequences whose cross-correlation is a predetermined value or higher. Therefore, in the case of the sequence group to which the sequence corresponding to a received SSS sequence belongs, even though the cross-correlation with any one of the sequences is computed, the cross-correlation is higher than those of other sequence groups.

Afterwards, in operation S40, a secondary cross-correlation between all the sequences of the selected sequence group and the received SSS sequence is computed.

For example, in the case of $77^{th}$ sequence, Group 19 may be selected among 30 sequence groups, and then the secondary cross-correlation may be calculated in relation to 18th, $48_{th}$, $77_{th}$, $105_{th}$, $132_{nd}$, and $158^{th}$ sequences of the selected Group 19.

In operation S50, a cell group ID is extracted through the sequence having the highest cross-correlation resulting from the secondary cross-correlation with the sequences of Group 19.

In the case of performing cell search through a cell search method according to one embodiment of the present invention, computational complexity will be described below. Initially, some sequence groups, for example 30 sequence groups, need to be added. However, under actual communication environments, in the case of Group 1 having 7 sequences maximally when the length of SSS sequence is 62, the computation is performed 30 times for group selection and 7 times for the sequences of Group 1, and accordingly the number of computations is 62*30+62*7=2294. In the case of Group 30 having one sequence minimally, the computation is performed 30 times for group selection, and thus the number of computations is 62*30=1860. The cell search method according to the present invention enables the computational complexity to be considerably reduced as compared to a typical full search method of computing all sequences in which the number of computations is 168*62=10416.

Figure 4:
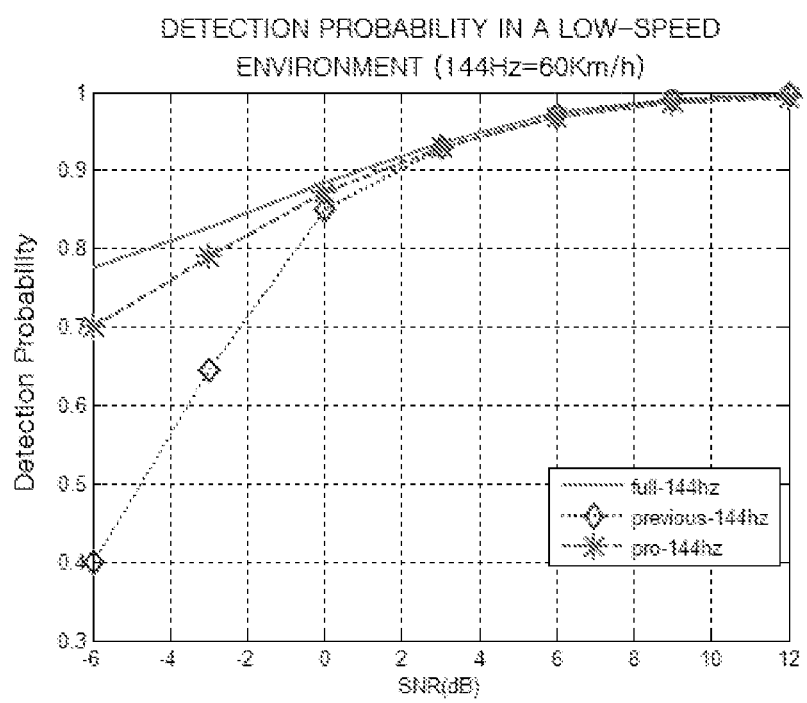
FIG. 4 illustrates a graph showing detection probability in a low-speed environment by a cell search method in a wireless communication system according to one embodiment of the present invention.
Figure 5:
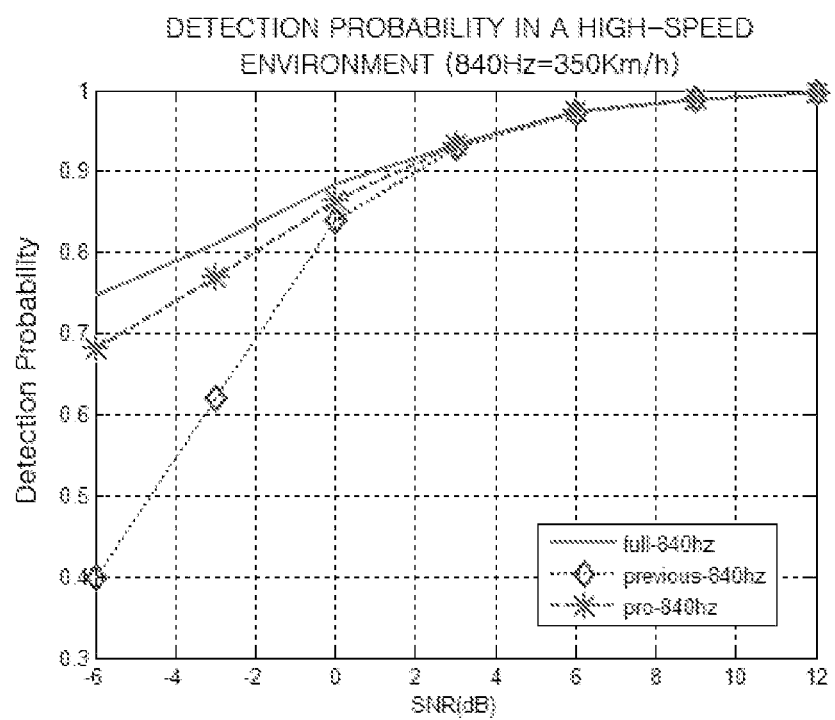
FIG. 5 illustrates a graph showing detection probability in a high-speed environment by a cell search method in a wireless communication system according to one embodiment of the present invention.

FIG. 4 illustrates a graph showing detection probability in a low-speed environment by a cell search method in a wireless communication system according to one embodiment of the present invention, and FIG. 5 illustrates a graph showing detection probability in a high-speed environment by a cell search method in a wireless communication system according to one embodiment of the present invention.

FIGS. 4 and 5 are graphs which are obtained by simulation using an Extended Typical Urban (TU) channel model for performance analysis of the cell search method according to the present invention. Herein, simulation parameters were set as illustrated in Table 1, and the graphs show detection probabilities when a velocity of a mobile station is low and high.

TABLE 1

| Parameter | Value |
| --- | --- |
| Mode | FDD |
| Channel | Extended TU(Typical Urban) |

TABLE 1-continued

| Parameter | Value |
|---|---|
| | (3GPP TS 36.211 v.8.8.0, 3GPP TS 36.101 v8.7.0) |
| SNR | −6:3:12 |
| | (min:step:max) |
| Doppler Frequency | 0(= 0 km/h), 144 Hz(= 60 km/h), 840 Hz(= 350 km/h) |
| Sampling Frequency | 1.92 MHz |
| Center Frequency | 2.5 GHz |
| CP | Normal CP |
| Channel Estimation | Estimated channel |

Herein, detection probability is the probability value showing how well a cell search was done. If the detection probability is 1, it means that cell search was done without error. If the detection probability is 0, it means that error rate of cell search is 100%.

As shown in FIGS. 4 and 5, the detection probability graphs for low-speed and high-speed communication environments illustrate that the results of the present invention denoted by asterisk (*) are similar or equal to those obtained by the typical full search method. Therefore, it can be seen that the cell search method according to the present invention reduces computational complexity, and also realizes high performance without performance degradation.

As described above, according to the present invention, when detecting SSS in order to search a cell group ID in 3GPP LTE communication, it is possible to reduce the computational complexity for SSS detection by selecting the sequence group of which cross-correlation between initially grouped SSS sequences is a predetermined value or more, computing cross-correlation with the sequences in the selected sequence group, and extracting a cell group ID through detection of the SSS sequence having the highest cross-correlation.

While the present invention has been described with respect to the specific embodiments, it will be apparent to those skilled in the art that various changes and modifications may be made without departing from the spirit and scope of the invention as defined in the following claims.

What is claimed is:

1. A cell search method in a wireless communication system, comprising:
    extracting a cell ID by using a first synchronization signal, and selecting a sequence group by computing a primary cross-correlation between a received second synchronization signal and respective sequence groups;
    computing a secondary cross-correlation between all sequences of the selected sequence group and the received second synchronization signal; and
    extracting a cell group ID through a sequence with the highest cross-correlation resulting from the computation of the secondary cross-correlation.

2. The cell search method of claim 1, wherein the first synchronization signal is a Primary Synchronization Signal (PSS) sequence.

3. The cell search method of claim 1, wherein the second synchronization signal is a Secondary Synchronization Signal (SSS) sequence.

4. The cell search method of claim 1, wherein the sequence group is created by computing cross-correlations between all the sequences which identify cell group IDs and grouping sequences having the cross-correlation of a predetermined value or more.

5. The cell search method of claim 1, wherein the selecting of the sequence group comprises computing a cross-correlation with any one of sequences belonging to the sequence group by sequence groups, and selecting a sequence group having the highest cross-correlation.

* * * * *